(12) United States Patent
Berkner et al.

(10) Patent No.: US 7,788,579 B2
(45) Date of Patent: Aug. 31, 2010

(54) AUTOMATED DOCUMENT LAYOUT DESIGN

(75) Inventors: Kathrin Berkner, Los Altos, CA (US);
Siddharth Joshi, Stanford, CA (US);
Edward L. Schwartz, Sunnyvale, CA
(US); Andrea Mariotti, Menlo Park, CA
(US)

(73) Assignee: Ricoh Co., Ltd., Tokyo (JP)

( * ) Notice: Subject to any disclaimer, the term of this patent is extended or adjusted under 35 U.S.C. 154(b) by 1106 days.

(21) Appl. No.: 11/369,261

(22) Filed: Mar. 6, 2006

(65) Prior Publication Data

US 2007/0208996 A1 Sep. 6, 2007

(51) Int. Cl.
*G06F 17/00* (2006.01)
*G06F 15/18* (2006.01)
*G06K 9/32* (2006.01)

(52) U.S. Cl. .................. 715/243; 715/204; 715/234; 715/255; 706/19; 382/298

(58) Field of Classification Search .................. 715/200, 715/201, 204, 205, 209, 210, 234, 238, 243, 715/251, 252, 255, 256, 273, 788, 794, 800, 715/801, 815, 838; 382/164, 165, 171, 176, 382/177, 178, 240, 295, 296, 298; 706/19, 706/45, 921
See application file for complete search history.

(56) References Cited

U.S. PATENT DOCUMENTS

| | | | |
|---|---|---|---|
| 5,495,567 A * | 2/1996 | Iizawa et al. ............. | 715/762 |
| 5,619,594 A | 4/1997 | Melen | |
| 5,625,767 A | 4/1997 | Bartell et al. | |
| 5,761,485 A | 6/1998 | Munyan | |
| 5,781,773 A | 7/1998 | Vanderpool et al. | |
| 5,781,879 A | 7/1998 | Arnold et al. | |
| 5,897,644 A | 4/1999 | Nielsen | |
| 5,960,126 A | 9/1999 | Nielsen et al. | |
| 5,963,966 A | 10/1999 | Mitchell et al. | |
| 6,018,710 A | 1/2000 | Wynblatt et al. | |
| 6,043,802 A | 3/2000 | Gormish | |
| 6,141,452 A | 10/2000 | Murao | |

(Continued)

FOREIGN PATENT DOCUMENTS

EP 156127 A2 * 8/2005

(Continued)

OTHER PUBLICATIONS

Gao et al., "An Adaptive Algorithm for Text Detection from Natural Scenes", Proceedings of the 2001 IEEE Computer Society Conferences on Computer Vision and Pattern Recognition, Kauai, HI, USA, Dec. 8-14, 6 pages.*

(Continued)

*Primary Examiner*—Laurie Ries
*Assistant Examiner*—Maikhanh Nguyen
(74) *Attorney, Agent, or Firm*—Blakely, Sokoloff, Taylor & Zafman LLP

(57) ABSTRACT

A method and apparatus for automated document layout creation is disclosed. In one embodiment, the method comprises receiving a first layout of document image objects and creating a second layout of document image objects subject to placement constraints corresponding to placement of document image objects, at least one of the placement constraints being based on object content in one or more of the document image objects.

16 Claims, 14 Drawing Sheets

U.S. PATENT DOCUMENTS

| | | | |
|---|---|---|---|
| 6,144,974 A * | 11/2000 | Gartland | 715/205 |
| 6,173,286 B1 | 1/2001 | Guttman et al. | |
| 6,178,272 B1 | 1/2001 | Segman | |
| 6,236,987 B1 | 5/2001 | Horowitz et al. | |
| 6,249,808 B1 | 6/2001 | Seshadri | |
| 6,317,164 B1 | 11/2001 | Hrusecky et al. | |
| 6,349,132 B1 | 2/2002 | Wesemann et al. | |
| 6,377,704 B1 | 4/2002 | Cooperman | |
| 6,598,054 B2 | 7/2003 | Schuetze et al. | |
| 6,665,841 B1 * | 12/2003 | Mahoney et al. | 715/204 |
| 6,704,024 B2 | 3/2004 | Robotham et al. | |
| 6,747,648 B2 | 6/2004 | Hoehn et al. | |
| 6,778,970 B2 | 8/2004 | Au | |
| 6,788,347 B1 | 9/2004 | Kim et al. | |
| 6,804,418 B1 | 10/2004 | Yu et al. | |
| 6,862,713 B1 | 3/2005 | Kraft et al. | |
| 6,873,343 B2 | 3/2005 | Chui | |
| 6,924,904 B2 | 8/2005 | Stevens et al. | |
| 6,970,602 B1 | 11/2005 | Smith et al. | |
| 7,010,746 B2 * | 3/2006 | Purvis | 715/249 |
| 7,020,839 B1 | 3/2006 | Hosoda | |
| 7,035,438 B2 | 4/2006 | Harrington et al. | |
| 7,069,506 B2 | 6/2006 | Rosenholtz et al. | |
| 7,107,525 B2 * | 9/2006 | Purvis | 715/244 |
| 7,151,547 B2 * | 12/2006 | Lin et al. | 345/627 |
| 7,171,617 B2 | 1/2007 | Harrington et al. | |
| 7,177,488 B2 * | 2/2007 | Berkner et al. | 382/298 |
| 7,203,902 B2 | 4/2007 | Balinsky | |
| 7,272,258 B2 | 9/2007 | Berkner et al. | |
| 7,330,608 B2 | 2/2008 | Berkner et al. | |
| 7,434,159 B1 * | 10/2008 | Lin | 715/243 |
| 7,487,445 B2 | 2/2009 | Purvis et al. | |
| 7,576,756 B1 * | 8/2009 | Good et al. | 345/635 |
| 7,603,620 B2 | 10/2009 | Erol et al. | |
| 2002/0073119 A1 | 6/2002 | Richard | |
| 2002/0184111 A1 | 12/2002 | Swanson | |
| 2003/0014445 A1 | 1/2003 | Formanek et al. | |
| 2003/0182402 A1 | 9/2003 | Goodman et al. | |
| 2004/0019851 A1 | 1/2004 | Purvis et al. | |
| 2004/0025109 A1 | 2/2004 | Harrington et al. | |
| 2004/0120589 A1 | 6/2004 | Lopresti et al. | |
| 2004/0145593 A1 | 7/2004 | Berkner et al. | |
| 2004/0201609 A1 | 10/2004 | Obrador | |
| 2004/0230570 A1 | 11/2004 | Hatta et al. | |
| 2005/0028074 A1 | 2/2005 | Harrington et al. | |
| 2005/0076290 A1 | 4/2005 | Balinsky | |
| 2005/0084136 A1 | 4/2005 | Xie et al. | |
| 2005/0223326 A1 | 10/2005 | Chang et al. | |
| 2005/0246375 A1 | 11/2005 | Manders et al. | |
| 2005/0289127 A1 | 12/2005 | Giampaolo et al. | |
| 2006/0022048 A1 | 2/2006 | Johnson | |
| 2006/0161562 A1 | 7/2006 | McFarland et al. | |
| 2007/0168852 A1 | 7/2007 | Erol et al. | |
| 2007/0198951 A1 | 8/2007 | Frank | |
| 2008/0235207 A1 | 9/2008 | Berkner | |

FOREIGN PATENT DOCUMENTS

| | | |
|---|---|---|
| JP | 10-105694 | 4/1998 |
| JP | 10-116065 | 5/1998 |
| JP | 10-162003 | 6/1998 |
| JP | 2000-231475 | 8/2000 |
| JP | 2000-306103 | 11/2000 |
| JP | 2001-101164 | 4/2001 |
| JP | 2002-351861 | 12/2002 |

OTHER PUBLICATIONS

Polyak et al., Nonlinear rescaling and proximal-like methods in convex optimization, Mathematical Programming, vol. 76, 1997, pp. 265-284.*

Baldick et al., "Efficient Optimization by Modifying the Objective Function: Applications to Timing-Driven VLSI Layout", IEEE Transactions on Circuits and Systems, vol. 48, No. 8, Aug. 2001, pp. 947-956.*

Kandemir et al., "A Linear Algebra Framework for Automatic Determination of Optimal Data Layouts", IEEE Transactions on Parallel and Distributed System, vol. 10, No. 2, Feb. 1999, pp. 115-135.*

Lin, Xiaofan, "Active Document Layout Synthesis", IEEE Proceedings of the eight International Conference on Document Analysis and Recognition, Aug. 29, 2005-Sep. 1, 2005, pp. 86-90, XP010878059, Seoul, Korea.

Boyd, Stephen, et al., "Review of Convex Optimization", Internet Article <http://www.cambridge.org/us/catalogue/catalogue.asp?isbn=0521833787>, Apr. 8, 2004, pp. 1-2, Cambridge University Press.

Lam, Heidi, et al., "Summary Thumbnails: Readable Overviews for Small Screen Web Browsers", Conference Proceedings on Human Factors in Computing Systems, Apr. 2, 2005-Apr. 7, 2005, pp. 1-10, XP002378456, ACM, US, Portland, Oregon.

European Search Report for European Patent Application No. EP 07250928, Jul. 8, 2009, 7 pages.

Zhao, et al., "Narrowing the Semantic Gap-Improved Text-Based Web Document Retrieval Using Visual features," IEEE, pp. 189-200.

Rollins, Sami, et al, "Wireless and Mobile Networks Performance: Power-Aware Data Management for Small Devices", Proceedings of the 5th ACM International Workshop on Wireless Mobile Multimedia WOWMOM '02, Sep. 2002, pp. 80-87.

Hexel, Rene, et al, "PowerPoint to the People: Suiting the Word to the Audience", Proceedings of the Fifth Conference on Australasian User Interface—vol. 28 AUIC '04, Jan. 2004, pp. 49-56.

Muer, O. Le, et al, "Performance Assessment of a Visual Attention System Entirely Based on a Human Vision Modeling," Proceedings of ICIP 2004, Singapore, 2004, pp. 2327-2330.

Matsuo, Y., et al, "Keyword Extraction from a Single Document using Word Co-occurrence Statistical Information," International Journal on Artificial Intelligence Tools, vol. 13, No. 1, Jul. 13, 2003, pp. 157-169.

Fukumoto, Fumiyo, et al, "An Automatic Extraction of Key Paragraphs Based on Context Dependency," Proceedings of Fifth Conference on Applied Natural Language Processing, 1997, pp. 291-298.

Aiello, Marco, et al, "Document Understanding for a Broad Class of Documents," IJDAR (2002) 5, pp. 1-16.

"About Netpbm," home page For Netpbm downloaded on Jan. 29, 2010, http://netpbm.sourceforge.net/, pp. 1-5.

"Optimization Technology Center of Northwestern University and Argonne National Laboratory," http://www.optimization.eecs.northwestern.edu/, 1 page, downloaded Jan. 29, 2010.

Dowsland, Kathryn A., et al., "Packing Problems," European Journal of Operational Research, 56 (1002) 2-14, North-Holland, 13 pages.

Iyengar, Vikram, et al., "On Using Rectangle Packing for SOC Wrapper/TAM Co-Optimization," www.ee.duke.edu/~krish/Vikram.uts02.pdf, 6 pages.

Meller, Russell D., et al., "The Facility Layout Problem: Recent and Emerging Trends and Perspectives," Journal of Manufacturing Systems, vol. 15/No. 5, 1996, pp. 351-366.

Hahn, Peter, M., "Progress in Solving the Nugent Instances of the Quadratic Assignment Problem," 6 pages.

Gould, Nicholas I.M., et al., "A Quadratic Programming Bibliography," http://www.optimization-online.org/DB_FILE/2001/02/285.pdf, 139 pages.

Anjos, Miguel F., et al., "A New Mathematical Programming Framework for Facility Layout Design," University of Waterloo Technical Report UW-W&CE#2002-4, www.optimization_online.org./DB_HTML/2002/454, 18 pages.

Maderlechner, et al., "Information Extraction from Dcoument Images using Attention Based Layout Sementation," Proceedings of DLIA, 1999, pp. 216-219.

Wang, et al., "MobiPicture—Browsing Pictures on Mobile Devies," 2003 Multimedia Conference, Proceedings of the 11th ACM International Conference on Multimedia, ACM MM'03, ACM 1-58113-722-2/03/0011, Berkeley, California, Nov. 2-8, 2003, 5 pages.

Fan, et al. "Visual Attention Based Image Browsing on Mobile Devices," International Conference on Multimedia and Exp., vol. 1, Baltimore, MD., IEEE, 0-7803-7965-9/03 Jul. 2003, pp. 53-56.

"Human Resources Toolbox, Human Resources Toolbox, Building an Inclusive Development Community: Gender Appropriate Technical Assistance to InterAction Member Agencies on Inclusion of People with Disabilities," Mobility International USA, 2002 Mobility International USA, http://www.miusa.org/idd/keyresources/hrtoolbox/humanresourcestlbx/?searchterm=Human Resources Toolbox, downloaded Feb. 3, 2010, 1 page.

Cormen, Thomas H., Leiserson, Charles, E., and Rivest, Ronald L., Introduction to Algorithms, MIT Press, Mc-Graw-Hill, Cambridge Massachusetts, 1997, 6 pages.

Roth, et al., "Auditory Browser for Blind and Visually Impaired Users," CHI'99, Pittsburgh, Pennsylvania, May 15-20, 1999, ACM ISBN 1-58113-158-5, pp. 218-219.

Erol, B., et al., "Multimedia Thumbnails: A New Way to Browse Documents on Small Display Devices," Ricoh Technical Report No. 31, XP002438409, Dec. 2005, http://www.ricoh.co.jp/about/business_overview/report/31/pdf/A3112.pdf>, 6 pages.

European Patent Office Search Report for European Patent Application EP 07 25 0134, Jun. 21, 2007, 9 pages.

Erol, Berna, et al., An Optimization Framework for Multimedia Thumbnails for Given Time, Display, and Application Constraints, Aug. 2005, 1-17 pages.

El-Kwae, E., et al., "A Robust Framework for Content-Based Retrieval by Spatial Similarity in Image Databases," Transactions on Information Systems (TOIS), vol. 17, Issue 2, Apr. 1999, pp. 174-198.

Dahl, Joachin and Vandenbeube, Lieven, "CVXOPT: A Python Package for Convex Optimization," http://abel.ee.ucla.edu/cvxopt/ downloaded Feb. 5, 2010, 2 pages.

Grant, Michael, et al., "CVX, Matlab Software for Disciplined Convex Programming," http://www.stanford.edu/~boyd/cvx/, downloaded Feb. 5, 2010, 2 pages.

Haralick, Robert M., "Document Image Understanding: Geometric and Logical Layout," IEEE Computer Vision and Pattern Recognition 1994 (CVPR94), 1063-6919/94, pp. 385-390.

Hsu, H.T., An Algorithm for Finding a Minimal Equivalent Graph of a Digraph, Journal of the ACM (JACM), V. 22 N. 1, Jan. 1975, pp. 11-16.

Nagy, Georgy, et. al., "Hierarchical Representation of Optically Scanned Documents," Proc. Seventh Int'l Conf. Pattern Recognition, Montreal, 1984 pp. 347-349.

Dengel, A., "ANASTASIL: A System for Low-Level and High-Level Geometric Analysis of Printed Documents" in Henry S. Baird, Horst Bunke, and Kazuhiko Yamamoto, editors, Structured Document Image Analysis, Springer-Verlag, 1992, pp. 70-98.

Duda, et al., "Pattern Classification, " Second Edition, Chapter 1—Introduction, Copyright © 2001 by John Wiley & Sons, Inc., New York, ISBN0-471-05669-3 (alk. paper), 22 pages.

Fukuhara, R., "International Standard for Motion Pictures in addition to Still Pictures: Summary and Application of JPEG2000/Motion-JPEG2000 Second Part", Interface, Dec. 1, 2002, 13 pages, vol. 28-12, CQ Publishing Company, no translation provided, 17 pages.

Japanese Office Action for Japanese Patent Application No. 2004-018221, dated Jun. 9, 2009, 6 pages.

Harrington, Steven J., et al., "Aesthetic Measures for Automated Document Layout," Proceedings of Document Engineering '04, Milwaukee, Wisconsin, ACM 1-58113-938-1/04/0010, Oct. 28-30, 2004, 3 pages.

Opera Software, "Opera's Small-Screen Rendering™," http://web.archive.org/web/20040207115650/http://www.opera.com/products/smartphone/smallscreen/ downloaded Feb. 25, 2010, pp. 1-4.

"AT&T Natural Voices" website, http://web.archive.org/web/20060318161559/http://www.nextup.com/attnv.html, downloaded Feb. 25, 2010, pp. 1-3.

* cited by examiner

Instructions

Please print clearly
Please use black or blue ink
Do not walk or chew gum while writing Date:          Width:          Height:          Depth:

Notes:

FIG. 14

Instructions
Please print clearly
Please use black or blue ink
Do not walk or chew gum while writing

History 001
On January 1,
width was small, height was small, depth was small,
condition was good.

History 002
On February 1,
width was small, height was medium, depth was small,
condition was fair.

Date:            Width:           Height:          Depth:

Notes:

FIG. 15

Instructions

Please print clearly
Please use black or blue ink
Do not walk or chew gum while writing Date:        Width:        Height:        Depth:

Notes:

History 001

On January 1,
width was small, height was small, depth was small,
condition was good.

History 002

On February 1,
width was small, height was medium, depth was small,
condition was fair.

History 003

On March 1,
width was small, height was small, depth was small,
condition was good.

FIG. 16

AUTOMATED DOCUMENT LAYOUT DESIGN

FIELD OF THE INVENTION

The present invention relates to the field of image processing; more particularly, the present invention relates to automated document layout design using a convex optimization framework and object content-dependent constraints.

BACKGROUND OF THE INVENTION

Laying out objects for a document is a well-known problem. A layout technique called SmartNails allowed scaling, cropping and re-positioning of document image objects that were laid out originally on one page. Given display size constraints, an optimization is performed to reposition the document image objects using a greedy algorithm. For more information, see U.S. Pat. No. 7,272,258, entitled "Reformatting Documents Using Document Analysis Information," filed Jan. 29, 2003, and U.S. Pat. No. 7,177,488, entitled "Resolution Sensitive Layout of Document Regions," filed May 9, 2003, both assigned to the corporate assignee of the present invention.

Genetic algorithms have been applied to the document layout problem. In one case, an optimization framework of combinatoric nature is used to optimize aesthetic criteria of a layout, given rectangles positioned on a page and attributes created by the user or an application. In this case, the aesthetic criteria include alignment, balance, uniformity, white-space fraction, white-space free-flow, regularity, page security and aspect ratio. Costs are defined for each of these criteria. A combined cost is defined as a weighted sum of the individual costs. However, content of the image objects does not influence the aesthetic measures. A user or some application program initially places a set of non-overlapping rectangles. Then the optimization achieves an adjustment of the positioning of the rectangles following the aesthetic measures. For more information, see U.S. Pat. No. 7,035,438, entitled "System and method for measuring and quantizing document quality," published Feb. 3, 2005; U.S. Pat. No. 7,171,617, entitled "System and method for fitness evaluation for optimization in document assembly," published Feb. 5, 2004; and U.S. Pat. No. 7,487,445, entitled "Constraint-optimization system and method for document component-layout generation," published Jan. 29, 2004.

In another approach, an existing formatted document page is taken, i.e. the layout is already represented, and the user is allowed to add more text to a text object or to reformat the page for a different size paper (from letter to A4). Thus, the original layout does not change very much, but is merely "adjusted." The optimization problem is formulated as a linear cost function with linear constraints and is solved using constraint solving software from the University of Washington. For more information, see Lin, X. (HP Labs), "Active Document Layout Synthesis," Proc. ICDAR 2005, Seoul, South Korea, pg. 86-90.

In yet another approach, a system takes an initial set of rectangles (containers) that need to be filled with content in which the positions of the initial rectangles (containers) are chosen first and cannot be altered. Then the content is fitted. The content is described as being image, graphic, text or a combination of the three. For more information, see U.S. Pat. No. 7,203,902, entitled "Document Composition," published Apr. 7, 2005.

U.S. Pat. No. 6,173,286, entitled "Computer-implemented optimization of publication layouts," filed Jan. 9, 2001, discloses a method that starts with a given layout representation similar to the containers described above. Then an optimization algorithm fills the containers with document objects from a data base. A cost is calculated for each object selection. The set of objects with minimal cost are finally placed. For the optimization of the filling of the containers, a biological programming model is used (evolution or genetic algorithm). The to-be-placed objects carry attributes that are used in the optimization step. They are compared to unspecified attributes of the layout.

SUMMARY OF THE INVENTION

A method and apparatus for automated document layout creation is disclosed. In one embodiment, the method comprises receiving a first layout of document image objects and creating a second layout of document image objects subject to placement constraints corresponding to placement of document image objects, at least one of the placement constraints being based on object content in one or more of the document image objects.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 14-16 describe the resulting complete layout starting with a seed layout specifying the upper part of the page as a desired region of objects that need to be filled out after printing by hand with a data entry device (e.g., a writing instrument).

DETAILED DESCRIPTION OF THE PRESENT INVENTION

Figure 1:
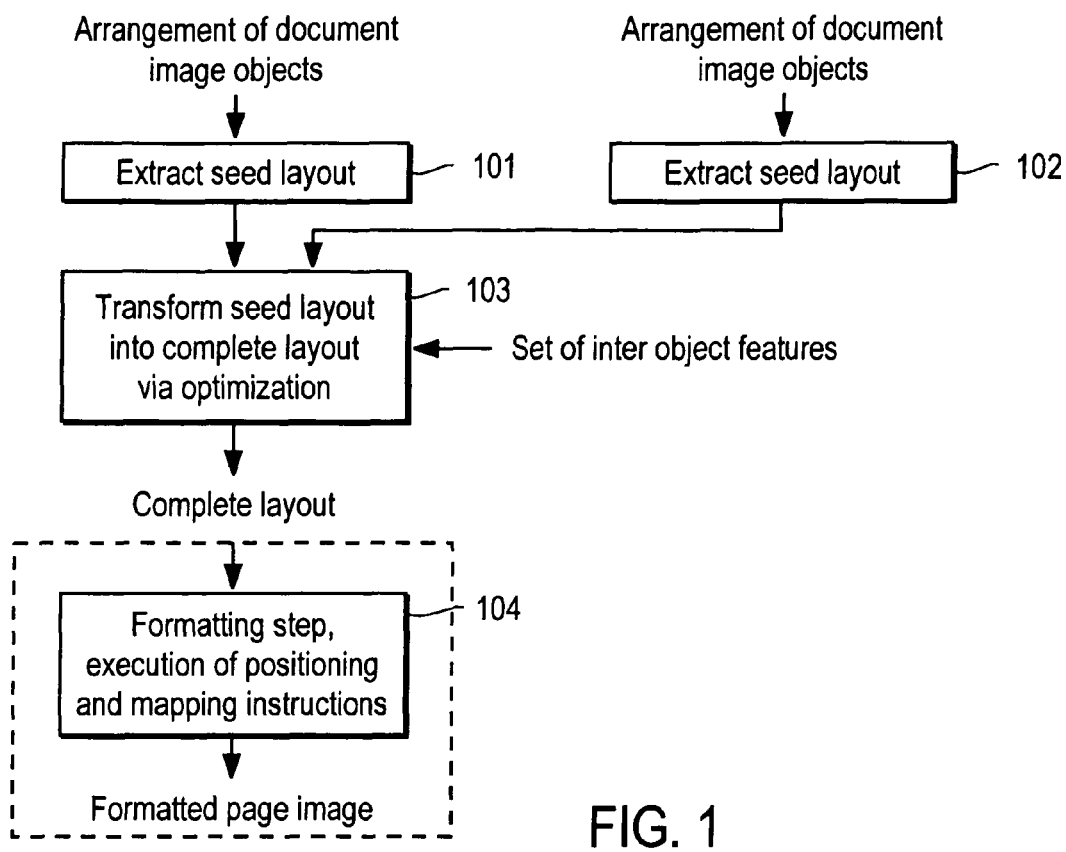
FIG. 1 is a flow diagram of one embodiment of a process for performing automatic document layout.

A method and apparatus for automated layout design is disclosed. In one embodiment, the automated layout design is accomplished using a convex optimization framework. The techniques start with a (seeded) collection of document image objects forming an arrangement, and from this arrangement, a final layout is computed that incorporates aesthetic measures into the optimization framework.

In one embodiment, a method automatically computes a layout representation from a set of initially placed document image objects that is optimal with respect to selected aesthetic measures. A convex optimization framework is used to compute the layout representation. In order to fit the framework, constraints and an objective function are defined. The constraints depend on the initial placement positions and attributes derived from the individual objects. Aesthetic layout measures, such as, for example, alignment or centering are included in the objective function. In one embodiment, open source software is used to compute the solution to the formulated optimization problem, such as "CVXOPT: A Python Package for Convex Optimization," Joachin Dahl, Lieven Vandenbeube, or Michael Grant, Stephen Boyd, Yinyu Ye, "CVX, Matlab Software for Disciplined Convex Progamming,", October 2005.

In one embodiment, as part of the automated layout design, a method for defining relative positioning constraints including user and application input is used. Also, in alternative embodiment, geometric aesthetic document layout measures suitable for use in convex optimization framework may also be used. The convex optimization framework may also apply limited-range-scaling, change of aspect ratio, and cropping to document objects, as well as include document object content into constraints and costs of a convex optimization framework.

A system for calculation of layout representation from initially seeded objects is also disclosed. In one embodiment, this system performs a relative positioning constraints calculation, adapts constraints to object content, creates a cost function, and controls an optimization solver.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

The automated layout design technique described herein begins with a seed layout that is underspecified. In one embodiment, this is a set of rectangular boxes placed on a canvas and each box is associated with a document image object. The seed layout may be given or may be derived from a document image or a collection of document images that are input or a combination of both. Deriving it from a document image input can be done in a number of ways. In one embodiment, this is done by performing a document layout analysis. Such an analysis consists of two parts, a geometric layout analysis and a logical document layout analysis. Both parts are well known to those skilled in the art. The paper by Robert M. Haralick, "Document Image Understanding: Geometric and Logical Layout," in IEEE Computer Vision and Pattern Recognition 1994 (CVPR94), pp. 385-390 is a review of various methods for performing geometric and logical document analysis. In his paper, he defines a geometric page layout of a document image page as a specification of the geometry of the maximal homogeneous regions and the spatial relations of these regions, and generating a Logical Page Structure by determining the type of page (page classification), assigning functional labels to each block of the page, and ordering the text blocks according to their reading order.

A goal of one embodiment is to achieve non-overlapping placement of the boxes (while maintaining the initial relative positioning) with respect to an aesthetic layout criterion. Such a criterion includes geometric measures such as, for example, alignment or centering, and is affected by contents of the objects. In one embodiment, the automated document layout is achieved using a convex optimization framework.

Definitions and Image Processing

Consider a collection of document image objects that is one of the following. The document image objects may be from a document image containing a set of objects (for example, a scan of a document may be manually or automatically segmented into objects). Alternatively, the document image objects may be objects from an electronic document page where positioning of the objects is known (e.g., created by Microsoft Word, Adobe Indesign, etc.). Also, the document image objects may be objects placed on a page by a user or some automated procedure (e.g., a packing algorithm). Such a collection is referred to herein as an arrangement of document image objects. Document image objects may include, for example, but are not limited to, images, figures, tables, text zones, columns, paragraphs, frames, rules, and logos.

An arrangement may explicitly or implicitly contain a subset of the information required for a complete layout. It contains information on mutual relationships between objects. For purposes herein, to "populate" an arrangement means to create an arrangement by specifying either the objects or a (proper) subset of the objects and some (but not all) information about size and/or position of objects. Alternatively, this might be called "seeding" an arrangement. Populating an arrangement specifies less information than the complete information in a layout.

There are numerous ways to create arrangements. An arrangement may be created by a user. In one embodiment, this is done with a graphical user interface (GUI). An arrangement may be created by using one layout as an example and eliminating some of the information (and in some embodiments also eliminating some of the objects). An arrangement may be created by using more than one layout as examples and eliminating, averaging or combining information. An arrangement can be created from nonlayout information (reading order, temporal information, similarity, high dimensional data, etc.) using self-organization, data visualization or other analysis techniques.

A document page has content and layout. Whereas content may be an image or a sequence of characters forming words, sentences, paragraphs, etc., layout is a description of an overall formatted design of the content.

For purposes herein, a layout is a complete layout if it is a description of a collection of document image objects with the following properties. For each object, a geometric shape and an anchor point with respect to the shape is defined (e.g., the shape is a rectangle, the anchor point is the upper left corner). Inclusion of an object is specified as either included or not included. For all included objects, a mapping of the anchor point of each object to a location on the page is given.

The content of an object may not have the same shape as the object's shape in the layout or might not have a fully specified shape (e.g., content is text without fixed line breaks that can be rendered into various rectangles). A complete mapping of the object content to the object shape is given. Such a map could include scaling, cropping, changing intensity (e.g., lowering contrast, alpha blending, etc.), or reflowing parts of the object, e.g., words, to fit the shape. From inter-object relationships based on geometrical or content properties features are defined to characterize groups of objects, e.g., alignment of objects or column or table layout.

The complete layout is fully specified (fully determined). Given is a collection of objects, spatial placement instructions (positioning, shape) and mapping of object content onto shape, there exists a formatting step executing the placement and mapping instructions. The resulting formatted page is unique with respect to the layout description, i.e. there do not exist two page images with differences in image intensity values that are formatted from the same complete layout.

A seed layout has the property that there may exist two page images formatted from the same layout instructions where the page images differ. Such a layout can be considered incomplete, underspecified, or underdetermined. In one embodiment, the following information needs to be present in the seed layout:

range of shapes including range of positions for an anchor point of object;

range of position of anchor point on page (absolute or relative);

if inclusion for each object is required or optional or mutually exclusive with one or more other objects;

range of mappings of object content onto shape; and inter object features, such as alignment or column layout for groups of objects that have these features.

There are many ways for an arrangement to have a seed layout description. For example, inclusion of objects may not be fully specified. Some objects in an arrangement might be included in the layout only if sufficient space is available. There may be a set of objects in a layout where only a proper subset (perhaps just one object) is to be included in the layout. For an object, its size in an arrangement might be approximate, known only in width or height or aspect ratio, or specified relatively with respect to other objects or unknown. An arrangement with an object containing a paragraph of text where the text is not yet specified might have known width but unknown height for the size of the object. An arrangement with an object containing an image where scaling of the image within some limits was allowed might have an approximate size of the object. Objects with incompletely specified size can be represented by boxes, rectangles, circles, points, etc. The position of an object in an arrangement might be approximate, known only in one dimension, or only known relative to other objects, constrained by a reading order or unknown. In an arrangement, one object might be specified to be below a second object and to the right of a third object. Other examples of how an arrangement may be a subset of the information in a layout would be apparent to one skilled in the art.

Given an arrangement of document image objects a seed layout describing the arrangement is extracted, then an optimization step is performed to reduce the space of all formatting mappings to one, which is the one rendering the complete layout.

FIG. 1 is a flow diagram of one embodiment of a process for performing automatic document layout. The process is performed by processing logic that may comprise hardware (circuitry, dedicated logic, etc.), software (such as is run on a general purpose computer system or a dedicated machine), or a combination of both.

Referring to FIG. 1, the process begins by processing logic extracting a seed layout from one or more arrangements of document image objects. FIG. 1 illustrates one embodiment where two arrangements are processed by extract seed layout processing blocks 101 and 102. Using the results of the extraction, processing logic transforms the seed layout into a complete layout via optimization (processing block 103). In one embodiment, this is done in response to a specified set of inter object features. The results of the transformation is a complete layout.

Subsequently, using the complete layout, processing logic performs formatting and executes positioning and mapping instructions to produce a formatted page image (processing block 104).

Figure 2:
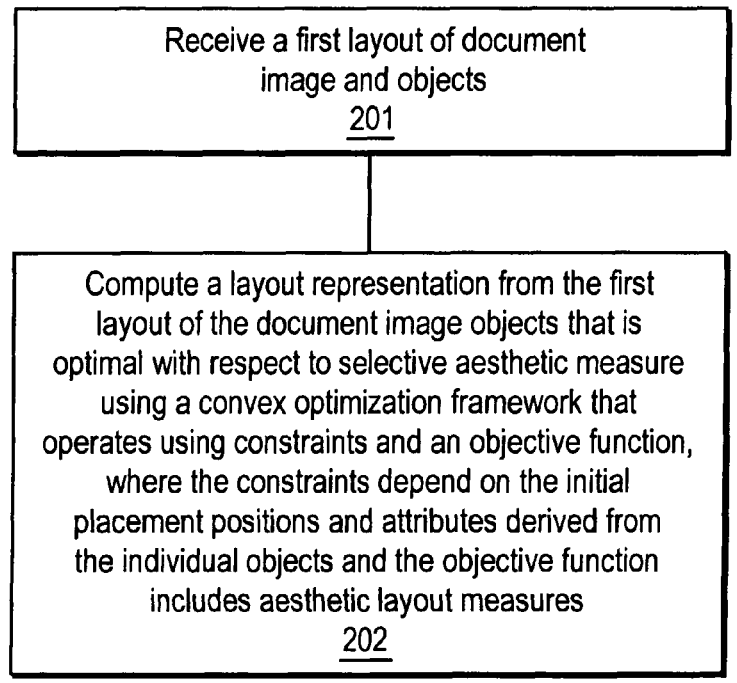
FIG. 2 is a flow diagram of one embodiment of an automatic document object layout process.

FIG. 2 is a flow diagram of one embodiment of a more detailed automatic document object layout process. The process is performed by processing logic that may comprise hardware (circuitry, dedicated logic, etc.), software (such as is run on a general purpose computer system or a dedicated machine), or a combination of both.

Referring to FIG. 2, the process begins by processing logic receiving a first arrangement of document image objects (processing block 201). Next, processing logic automatically computes a layout representation from the seed layout of the document image objects that is optimal with respect to selective aesthetic measures using a convex optimization framework that operates using constraints and an objective function, where the constraints depend on the initial placement positions and attributes derived from the individual objects and the objective function includes aesthetic layout measures (processing block 202).

In one embodiment, constraints are derived from the content of individual image objects. In other words, objects carry attributes that are derived from the object content itself, not necessarily given by the user, and then those attributes are used to formulate constraints and costs.

The automatic document layout is described herein may also be applied to subparts of a document. A subpart might be a column, table, table cell, graphic, figure/graphical table with caption, group of related objects, etc. Automatic document layout may be applied hierarchically, such that objects in one application function as a full page in another. Hierarchical application may be either top-down, bottom-up or a combination.

A Convex Optimization Framework

In one embodiment, a convex optimization framework is used for the layout optimization problem. A convex optimization problem may be expressed in the following form minimize $f_o(x)$ subject to $f_i(x) \leq 0$ i=1, ..., m $Ax=b$ where $f_0, f_1, \ldots, f_m$ are convex functions and x is the decision variable. The function $f_0$ is called the objective or cost function and the inequalities $f_i(x) \leq 0$ (i=1, ..., m) are called inequality constraints. When $f_0, f_1, \ldots, f_m$ are affine functions the problem is referred to herein as a Linear Programming (LP) problem. In one embodiment, the calculation of the optimal solution for a convex optimization problem is performed using interior point algorithms as set forth in Boyd, S. and Vandenberghe, L, "Convex Optimization," Cambridge University Press, Cambridge, UK, 2004. These algorithms produce globally optimal solutions very efficiently and are scalable in the number of variables. In other embodiments, other algorithms for solving optimization problems may be used, for example a simplex algorithm may be used for LP problems. These algorithms are, in general, faster than genetic algorithms or simulated annealing methods, which could be used in alternative embodiments. Note, however, that these later methods do not necessarily produce the globally optimal solution.

Figure 3:
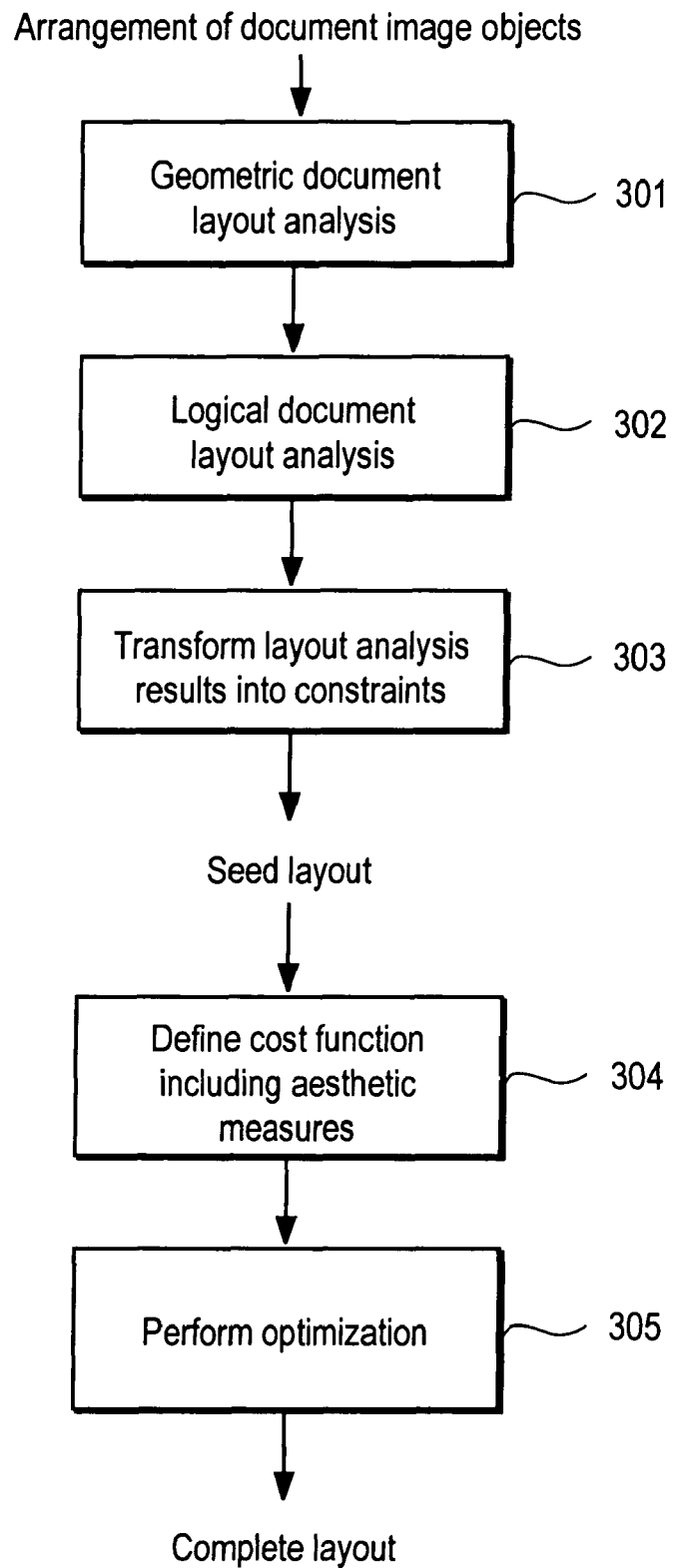
FIG. 3 is a flow diagram of one embodiment of a process for generating a complete layout.

FIG. 3 is a flow diagram of one embodiment of a process for generating a complete layout. The process is performed by processing logic that may comprise hardware (circuitry, dedicated logic, etc.), software (such as is run on a general purpose computer system or a dedicated machine), or a combination of both.

Referring to FIG. 3, with an arrangement of document image objects, the process begins by processing logic performing geometric document layout analysis on the arrangement of document image objects (processing block 301). Processing logic also performs logical document layout analysis on the arrangement of document image objects (processing block 302). After performing geometric and logical document layout analysis, processing logic transforms the layout analysis results into constrains (processing block 303). This results in a seed layout.

Using seed layout, processing logic defines a cost function including aesthetic measures (processing block 304). Thereafter, processing logic performs an optimization to generate the complete output (processing block 305).

Figure 4:
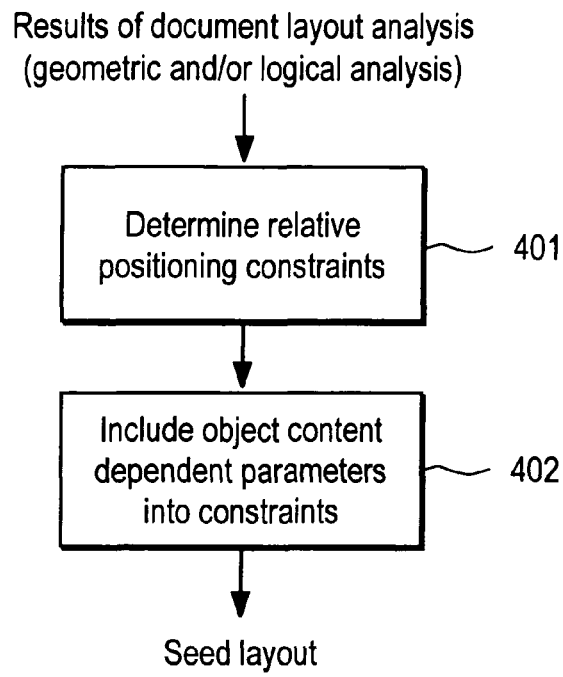
FIG. 4 is a flow diagram of one embodiment of the process for transforming layout analysis results into constraints.

FIG. 4 is a flow diagram of one embodiment of the process for transforming layout analysis results into constraints. The process is performed by processing logic that may comprise hardware (circuitry, dedicated logic, etc.), software (such as is run on a general purpose computer system or a dedicated machine), or a combination of both. The process of FIG. 4 may be used as part of processing block 303 of FIG. 3.

Referring to FIG. 4, the process begins by processing logic by using the results of document layout analysis (geometric and/or logical) to determine relative positioning constraints (processing block 401). After determining relative position constraints, processing logic includes object content dependent parameters into the constraints (processing block 402). The results of the process are the seed layout.

Figure 5:
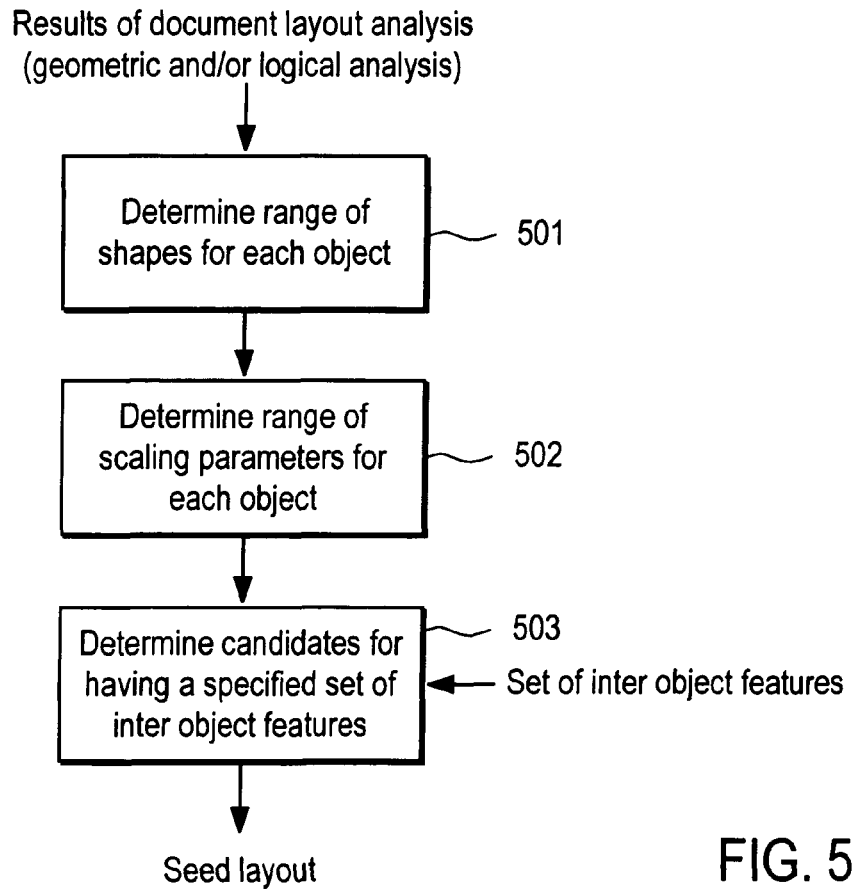
FIG. 5 is a flow diagram of one embodiment of a process for incorporating object content dependent parameters into constraints.

FIG. 5 is a flow diagram of one embodiment of a process for incorporating object content dependent parameters into constraints. The process is performed by processing logic that may comprise hardware (circuitry, dedicated logic, etc.), software (such as is run on a general purpose computer system or a dedicated machine), or a combination of both. The process of FIG. 5 may be used as part of processing block 402 of FIG. 4.

Referring to FIG. 5, using the results of document layout analysis (geometric and/or logical analysis), processing logic determines the range of shapes for each object (processing block 501). Processing logic then determines the range of scaling the parameters for each object (processing block 502). In alternative embodiments, the range of scaling the parameters may not need to be determined for each object.

After determining the range of shapes of each object in the range of scaling parameters for each object, processing logic determines a candidate for having a specified set of inter object features (processing block 503). The set of inter object features is specified by the user or application. In the results of this determination are the seed layout.

Figure 6:
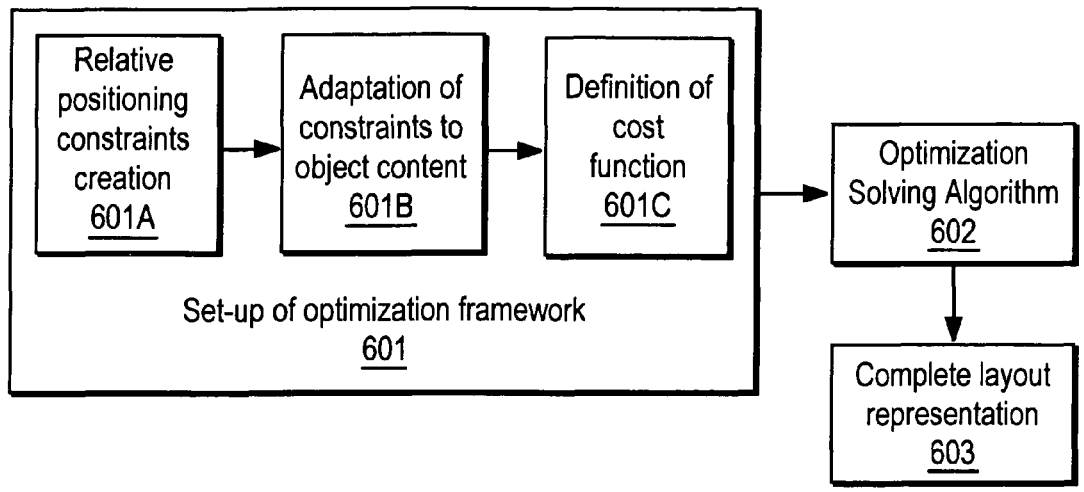
FIG. 6 is a flow diagram of a more specific embodiment of a process for using an optimization framework for calculating a layout representation.

FIG. 6 is a flow diagram of a more specific embodiment of a process for using an optimization framework for calculating a layout representation. The process is performed by processing logic that may comprise hardware (circuitry, dedicated logic, etc.), software (such as is run on a general purpose computer system or a dedicated machine), or a combination of both.

Referring to FIG. 6, process begins by setting up an optimization framework (processing block 601). In one embodiment, setting up an optimization framework comprises creating relative positioning constraints (processing block 601A), processing logic adapts the constraints to object content (processing block 601B). Then processing logic defines a cost function (processing block 601C).

After setting up the optimization framework, processing logic runs an optimization solving algorithm based on inputs from the optimization framework to generate a complete layout representation 603 (processing block 602).

Figure 7:
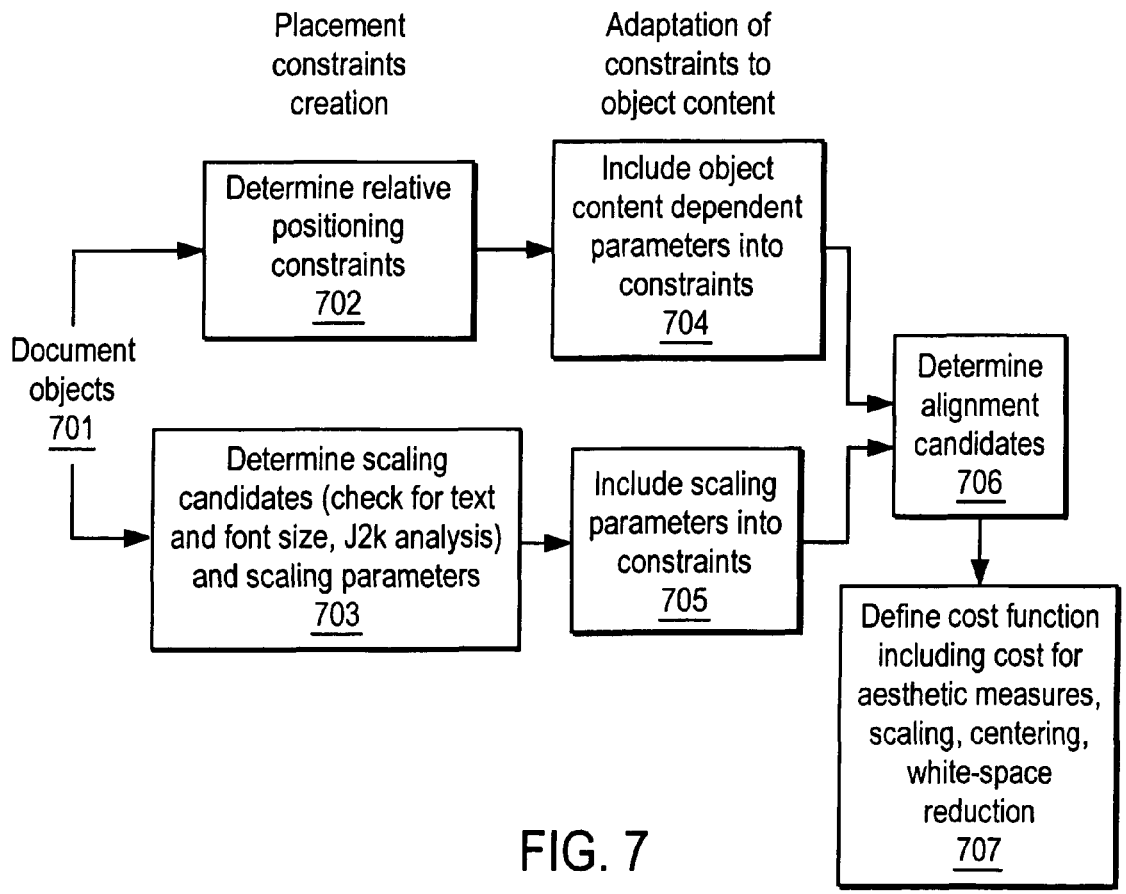
FIG. 7 is a flow diagram of one embodiment of a process for setting up an optimization problem including the constraints and the cost function for the calculation of the layout representation.

FIG. 7 is a flow diagram of one embodiment of a process for setting up an optimization problem including the constraints and the cost function for the calculation of the layout representation. The process is performed by processing logic that may be comprise hardware (circuitry, dedicated logic, etc.), software (such as is run on a general purpose computer system or a dedicated machine), or a combination of both.

Referring to FIG. 7, document objects are placed on a canvas (processing block 701). Such a placement may be performed by the system or may be performed prior to being input into the system. The system creates placement constraints. More specifically, processing logic determines the grouping of objects and relative positioning constraints of groups and elements inside a group (processing block 702) and processing logic determines scaling candidates and scaling parameters (processing block 703). To determine scaling candidates, in one embodiment, processing logic checks for text and font size and performs a JPEG 2000 analysis. See U.S. Pat. No. 7,330,608, filed Dec. 22, 2004, entitled "Semantic Document Smartnails" and U.S. Pat. No. 7,272,258, filed Jan. 29, 2003, entitled "Reformatting Documents Using Document Analysis Information".

Processing logic then adapts the constraints based on the object content. In one embodiment, this is performed by processing logic including content dependent parameters into the constraints (processing block 704) and processing logic including scaling parameters into the constraints (processing block 705).

Next, the system takes the adapted constraints and determines alignment candidates (processing block 706). After determining alignment candidates, processing logic defines the cost function that includes the cost for aesthetic measures, scaling, centering and/or white-space reduction (processing block 707).

In one embodiment, the resulting document layout is conditioned in that the final layout does not contain overlapping document objects. In order to incorporate non-overlapping constraints into optimization probe from paragraph 0054 above, a relative positioning of document objects is determined. In other words, for each pair of document objects Oi, Oj, it has to be determined whether Oi is left of Oj, Oj is left of Oi, Oi is on top of Oj, or Oj is on top of Oi.

Definition and Creation of Relative Positioning Graph Pairs

In one embodiment, the relative positioning constraints are represented by graph models. For the document layout problem, two graphs are used, a horizontal object positioning graph and a vertical object positioning graph. Horizontal and vertical object positioning graphs are constructed by modeling document objects as vertices of a graph and constructing a directed edge from $O_i$ to $O_j$ in the horizontal graph if $O_j$ is to the right of $O_i$, and constructing a directed edge from $O_i$ to $O_j$ in the vertical graph if $O_j$ is below $O_i$. In alternative embodiments, other relative positioning graphs may be used, such as a graph where a directed edge indicates "to the left." This results in two directed acyclic graphs, forming a relative positioning graph pair, being created for a document. In order to satisfy relative positioning constraints for the convex optimization framework in (1) the condition on the two graphs is that between each pair of vertices (i,j) there has to be a path either from i to j or from j to i in either the horizontal or vertical graph. See Boyd, S. and Vandenberghe, L, "Convex Optimization," Cambridge University Press, Cambridge, UK, 2004.

Given a directed graph G, the graph that contains a path between each pair of vertices of the graph and has minimal number of edges is referred to herein as a minimum equivalent graph of G. If G is an acyclic directed graph, then the minimum equivalent graph of G is equivalent to the transitive closure of G. Algorithms are known in the literature to produce a minimum equivalent graph, e.g., Hsu, H. T., "An Algorithm for Finding a Minimal Equivalent Graph of a Digraph," Journal of the ACM (JACM), v.22 n. 1, p. 11-16, January 1975. Computing the minimum equivalent graphs, GV_min and GH_min, for the horizontal and vertical graphs satisfies the condition for forming a relative positioning graph pair. An example of an arrangement where rectangles correspond to objects and only provide approximate position for objects, i.e., seeded rectangles, and the associated graph pair is shown in FIG. 5A.

There may be redundant edges in the graphs GV_min and GH_min, i.e. there may be an edge in GV_min or GH_min that can be removed such that the new graphs still satisfy the conditions for a relative positioning graph pair. Removing the redundant edge can be done in various ways. For example, redundant edges may be removed from only in one of the graphs, horizontal or vertical, which forces layout with preference for row or column-type layout. Alternatively, redundant edges may be removed from the graph that has more edges. Also, user or application input can be used to control redundant edge removal. For example, the user provides information on which edges should be in the final relative positioning graphs.

Relative Positioning Constraints and X/Y Trees

Relative positioning constraints may be derived purely from geometric properties or from the result of a layout analysis. One output of a layout analysis may be a structure capturing the logical partitioning of a document. That structure may be represented by a tree (X-Y trees by Georgy Nagy, Sharad Seth, "Hierarchical Representation of Optically Scanned Documents," Proc. Seventh Int'l Conf. Pattern Recognition, pp. 347-349, Montreal, 1984, GTrees by Dengel, A., "ANASTASIL: A System for Low-Level and High-Level Geometric Analysis of Printed Documents," in Henry S. Baird, Horst Bunke, and Kazuhiko Yamamoto, editors, Structured Document Image Analysis. Springer-Verlag, pp. 70-98, 1992). These trees impose a hierarchy of partial orderings of objects. At a high level of the hierarchy a relative positioning of groups of objects is considered. After assigning a partial order to those groups, a partial order for objects inside of an individual group may be assigned. That partial order is with respect to objects in the parent group, but not to elements in other groups.

With respect to X-Y trees, in one embodiment, each node in the X-Y tree corresponds to a rectangle. The successors of a node correspond either to a set of rectangles obtained by horizontal partitions (X-cuts) of the parent rectangle, or the set of rectangles obtained by vertical partitions (Y-cuts). Horizontal and vertical subdivisions (X-cut-sets and Y-cut-sets) alternate strictly, level by level. The first subdivision may be arbitrarily set to either horizontal or vertical. The root of the X-Y tree is the rectangle corresponding to the entire page.

Figure 8:
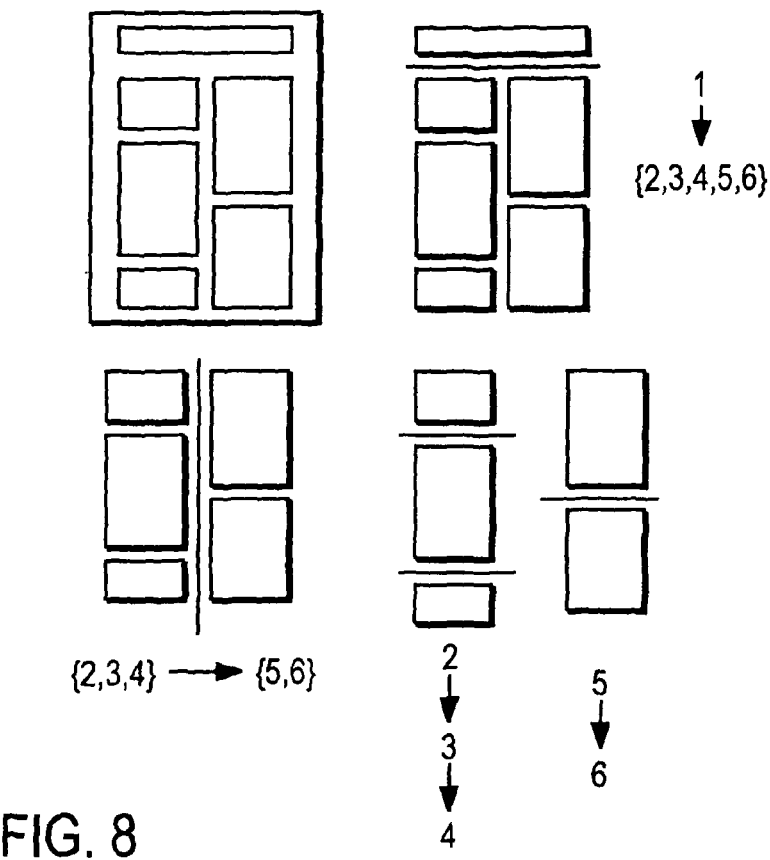
FIG. 8 shows a sequence of X- and Y-cut for a document resulting in a hierarchical partition.
Figure 9:
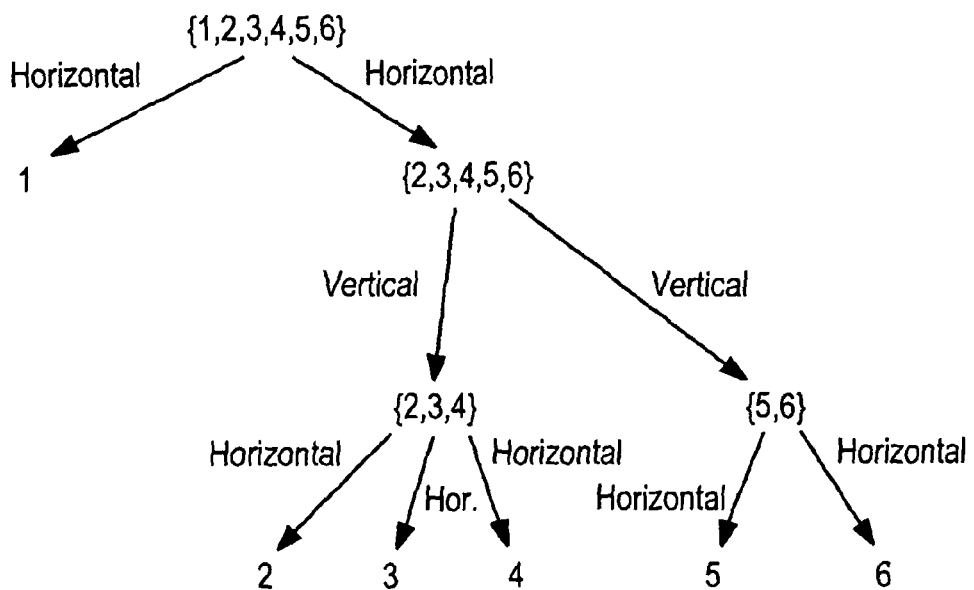
FIG. 9 shows the X-Y tree for the partitioning in FIG. 12.
Figure 10:
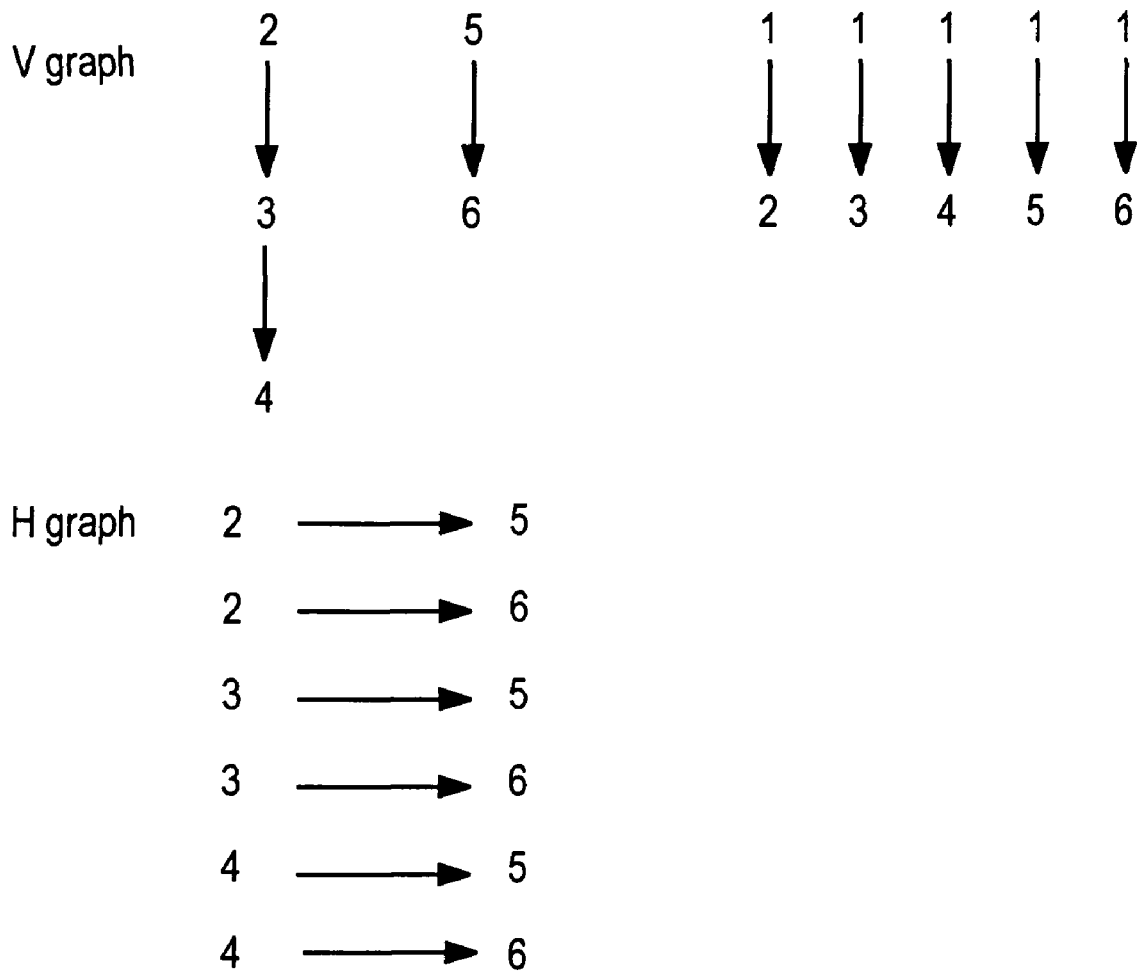
FIG. 10 shows the horizontal and vertical positioning graphs extracted from the X-Y tree.

FIG. 8 shows a sequence of X- and Y-cuts for a document resulting in a hierarchical partition. FIG. 9 shows the X-Y tree for the partitioning in FIG. 8. FIG. 10 shows the horizontal and vertical positioning graphs extracted from the X-Y tree. Such a graph pair may not be minimal. Another processing operation can be applied to remove redundant edges in the graph pair.

In the example, there was either a X- or Y-cut possible at each step in the partition. In the case that both cuts are possible, a set of different trees can be created, the optimization performed for each tree, the result evaluation, and a best one (the one with lowest cost) chosen. Another possibility is to have the user chose one out of all the possible trees. Below is an example of pseudo code to perform this process:

Let T be the X-Y tree. Each node t in T represents a collection of image objects, $\Omega(t)$.

Create a vertex set V that contains a vertex for each image object O_i.

Define edge sets E_v=Ø, E_h=Ø, and graphs G_v=(V, E_v), G_h=(V, E_h)

For a node t, define V (t) to be the set of vertices that represent the objects in $\Omega(t)$.

For each parent node p in T
    Set c_1, . . . , c_m be the children of p and $\Omega(c\_i)$ the set of image objects contained in c_i
      if c_1, . . . c_m are generated from p via a horizontal cut
        for each sibling pair (c_i, c_j)
          if c_i is above c_j
            connect each vertex in V (c_i) via a directed edge with each vertex in V(c_), and add that edge to E_v
      if c_1, . . . c_m are generated from p via a vertical cut
        for each sibling pair (c_i, c_j)
          if c_i is left of c_j
            connect each vertex in V (c_i) via a directed edge with each vertex in V (c_j), and add that edge to E_h
    update G_v=(V, E_v), G_h=(V, E_h)

For each leaf node t_L of T:
    Compute relative positioning graph pair (G_Lh, G_Lv) for $\Omega(t\_L)$
    Add edges of G_Lh to G_h and edges of G_Lv to E_v
    update G_v=(V, E_v), G_h=(V, E_h)

G_v and G_h are the final graph pairs

It is also possible to perform a different kind of automated layout on the partitions of an X-Y tree, e.g. the layout used in creating SmartNails, where a ranking was performed on the objects, and a greedy algorithm picked a subset of object.

Grouping information may also be included in the initial arrangement (e.g., given by the user).

Methods may be used in combination. For example, user input can be used for eliminating some of the redundant edges and other redundant edges can be eliminated using an automated method. While eliminating redundant edges is typically useful, in some embodiments only some of the redundant edges are eliminated and in other embodiments no redundant edges are eliminated.

Once the graphs are defined the non-overlapping constraint for two objects is expressed through the following linear inequality $$x_i + w_i - x_j \leq 0,$$

if there is a directed edge from i to j in the horizontal graph. Similarly, $$y_i + h_i - y_j \leq 0,$$

if there is a directed edge from i to j in the vertical graph. Here $(x_k, y_k)$ are the positioning coordinates for the upper left corner of object $O_k$ and $w_k$ and $h_k$ are width and height of the object.

Figure 11A:
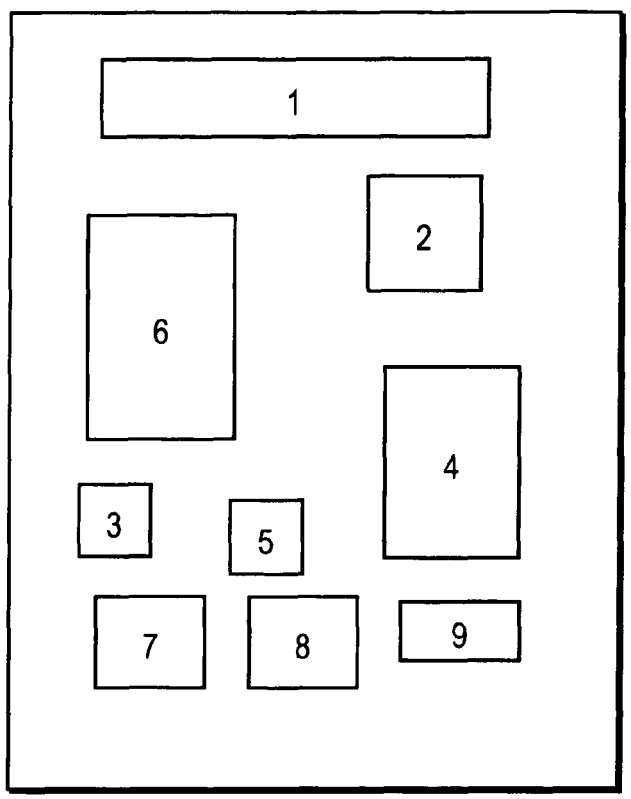
FIG. 11A illustrates an example of seeded rectangles.
Figure 11B:
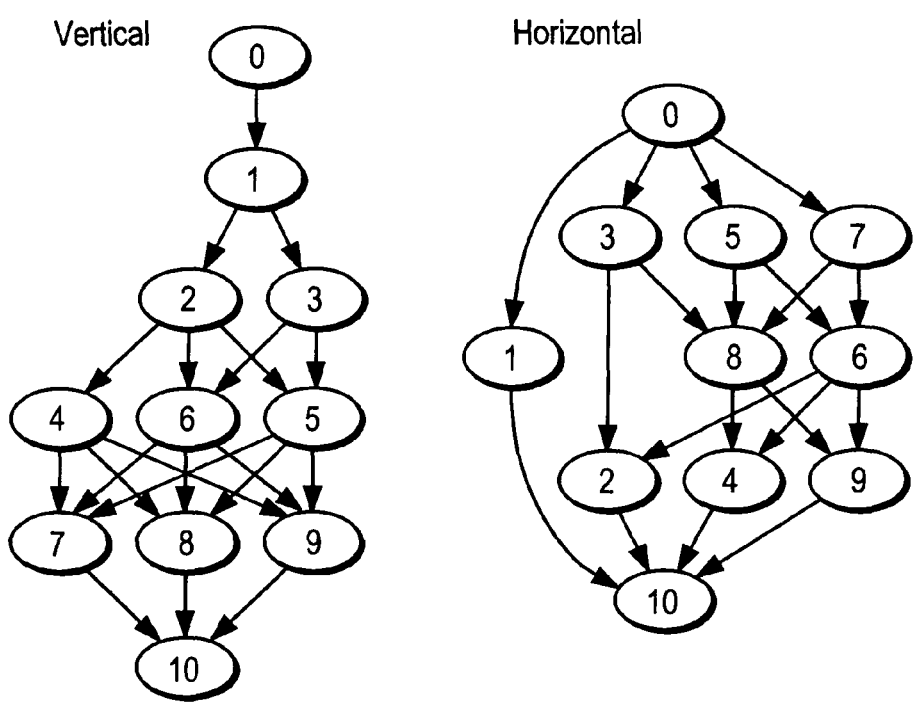
FIG. 11B illustrates an example for vertical (left) and horizontal (right) relative positioning graphs for the initial placement of FIG. 11A.

FIG. 11B illustrates an example for vertical (left) and horizontal (right) relative positioning graphs for the arrangement of FIG. 11A.

Another possibility of choosing one out of the set of all possible relative positioning graph pairs is to feed a subset of all possible relative positioning graph pairs into the optimization algorithm, compute layouts and associated costs and chose the final relative positioning graph pair depending on an evaluation of the layout costs, e.g. chose the one with smallest cost or following some user preference. Examples for layouts based on different relative positioning graph pairs are shown in FIG. 12.

Figure 12:
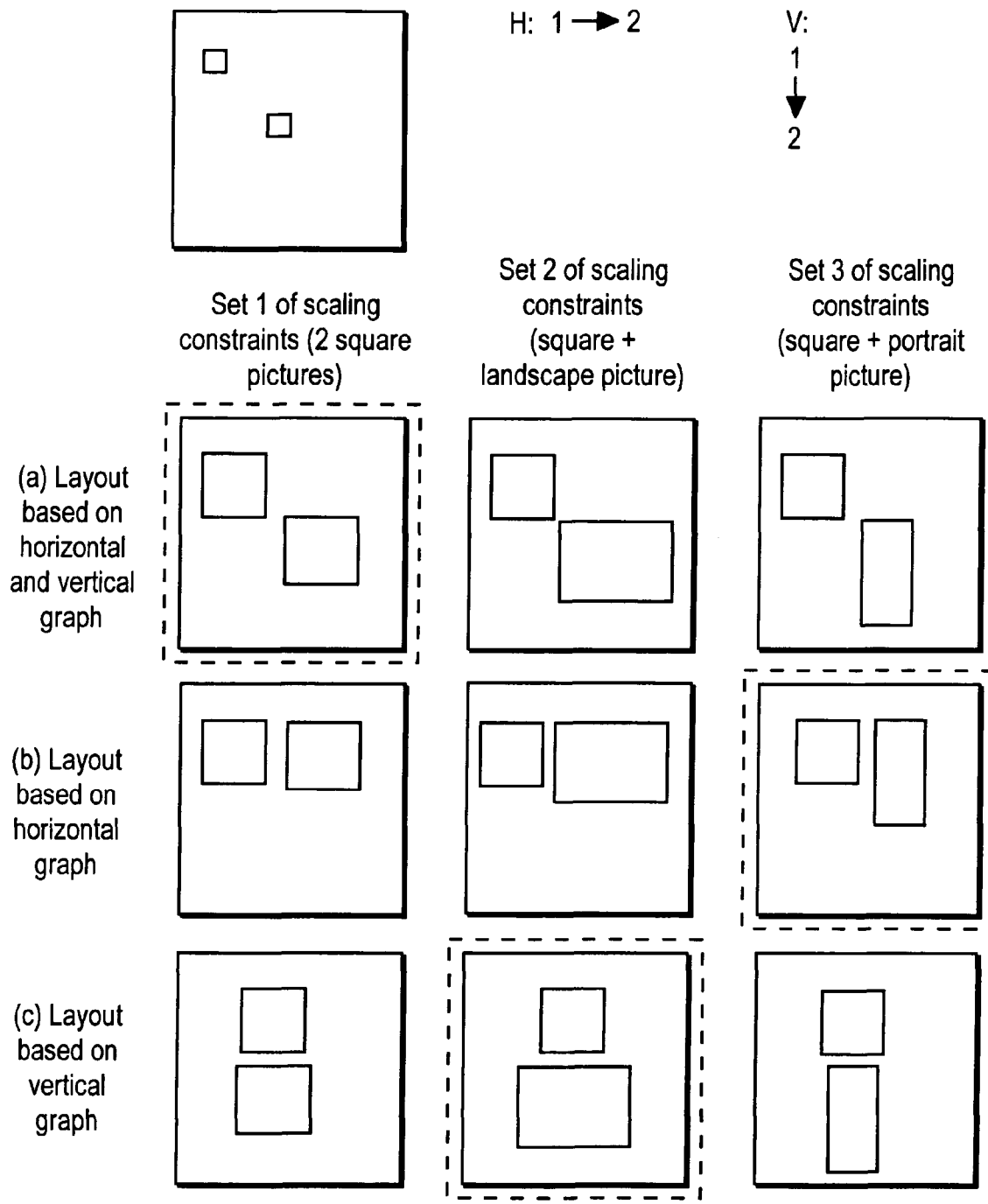
FIG. 12 illustrates examples for layouts based on different relative positioning graph pairs

Referring to FIG. 12, examples for using a set of relative positioning graph pairs and choosing a layout dependent on evaluation of the cost function are shown. The top illustrates the an arrangement with associated complete horizontal and vertical graphs, while rows (a), (b), and (c) show possible solutions for different graph pairs (horizontal and vertical, horizontal only, vertical only) for objects with different scaling constraints. An example cost function is to minimize the size of a square bounding box containing both objects with both graphs given priority in the case of a tie. The dashed layouts show the one selected out of each possible layout depending on evaluation of the cost.

Alternative Implementations of Aesthetic Geometric Measures for Document Layout

Different aesthetic measures for evaluation of document layout quality may be used. For example, alignment, balance, uniformity, white-space free flow as well as others. The measures take into consideration only the geometrical properties of the layout, i.e., the positioning of the rectangles on the page and the rectangle dimensions. In combination, these criteria can be incorporated in the convex optimization framework to produce a good document layout and are discussed below in more detail.

Alignment

One method described herein is an automated way to align objects given their arrangement. Boxes can be aligned either vertically or horizontally. Boxes can be vertically aligned along either the left edge or the right edge, and horizontally aligned along either the top edge or the bottom edge. Described below is one embodiment of a method to align boxes horizontally, a symmetrical approach is applied to align the boxes vertically.

One method to align boxes (horizontally) consists of two operations. First, candidates for alignment are selected. Initially, the pair of boxes that have an edge between them in the horizontal graph, are initially the candidates for horizontal alignment. Second, consider two such boxes i and j with initial heights $h_{i0}$ and $h_{j0}$ and initial y-coordinates $y_{i0}$ and $y_{j0}$. If $$|y_{i0} - y_{j0}| \leq |(y_{i0} + h_{i0}) - (y_{j0} - h_{j0})| \quad (1)$$

then the boxes are candidates for alignment along the top edge, otherwise the boxes are candidates for alignment along the bottom edge. Finally, if $$\min(|y_{i0}-y_{j0}(y_{i0}+h_{i0})-(y_{j0}+h_{j0})| \leq \epsilon \min(h_{i0},h_{j0}), 0<\epsilon<1 \quad (2)$$

then boxes are selected for alignment, otherwise not. In one embodiment, $\epsilon$ is set to 0.5.

Next, the cost of non-alignment (the weight coefficient) is determined. When two boxes are selected for alignment, say along the top edge, the following cost is added to the objective, $$W_{ij}|y_i-y_j|, \quad (3)$$

where $y_i$ and $y_j$ are the variables for the y-coordinate of the boxes i and j respectively, and $W_{ij}$ is the weight of the cost of non-alignment which is taken to be $$W_{ij}=\min(A_{i0},A_{j0}), \quad (4)$$

where $A_{i0}$ is the initial area of box i ($A_{i0}=w_{i0} h_{i0}$). If the boxes are selected to be aligned along the bottom edge, then the following cost is added to the objective, $$W_{ij}|(y_{i0}+h_{i0})-(y_{j0}+h_{j0})|, \quad (5)$$

where $h_{i0}$ and $h_{j0}$ are the variables for the height of the boxes i and j, respectively.

Aligning centers can be handled in a similar manner using $y_{i0}+h_{i0/2}$ and $y_{j0}+h_{j0/2}$.

Centering and White Space Reduction

In one embodiment, the global positioning of the complete set of objects is adjusted. To shift the arrangement to the top left corner, the following cost is added to the objective $$\alpha \left( \sum_i x_i + \sum_i y_i \right), \quad (6)$$

where $\alpha$ is small compared to the $W_{ij}$ from Eq. (4). In one embodiment, $\alpha$ is set to 1. If $\alpha$ is large compared to the $W_{ij}$, the boxes will be pushed to the left and the top with a relatively larger force, which is not desirable as it may produce non-alignment. To center the arrangement, instead of the cost above, the following cost is included $$\alpha \left( \sum_i |x_i + w_i/2 - x_c| + \sum_i |y_j + h_j/2 - y_c| \right), \quad (7)$$

where ($x_c$, $y_c$) is the center of the page. Adding such a small cost, moves the boxes together and therefore reduces the white space between them.

Figure 13:
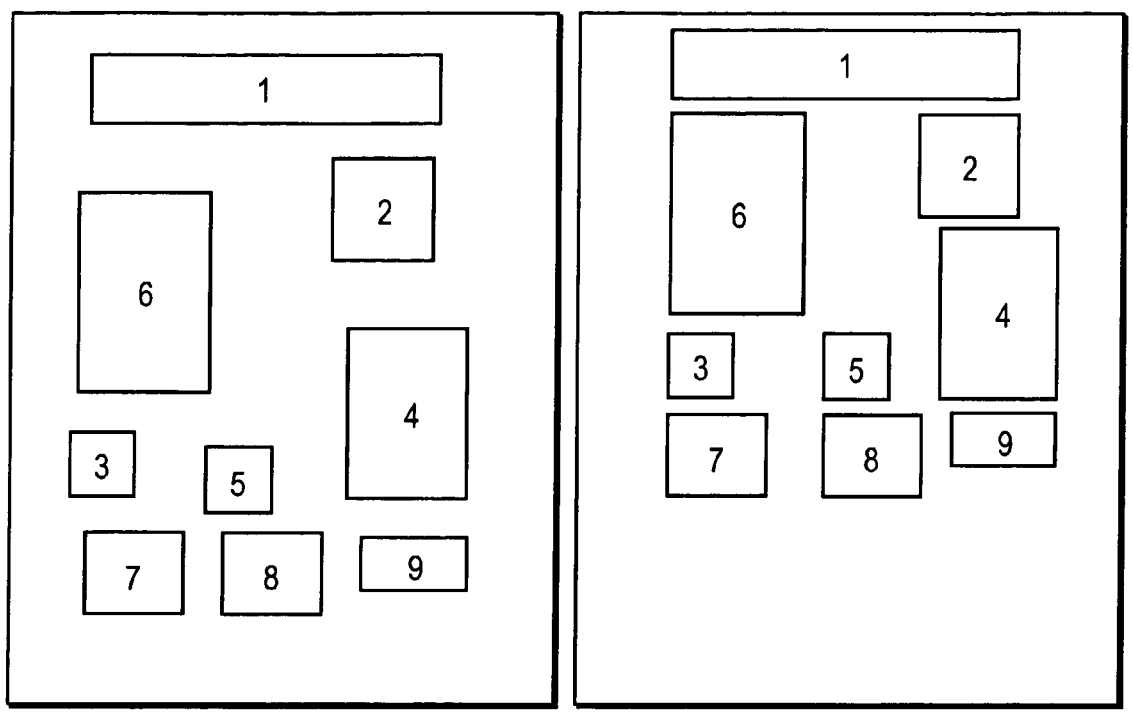
FIG. 13 illustrates an example showing the layout representation (right) computed from the initial placement (left) including an alignment and white-space reduction criterion.

FIG. 13 illustrates an example showing the layout representation (right) computed from the initial placement (left) including an alignment and white-space reduction to top-left criterion.

Global positioning to more complex criteria than top-left or centered can be performed. For example, objects might be moved towards one of the preferred positions in the "rule of thirds" photographic composition rule with an appropriate cost function.

Positioning of Hand-Written Notes in the Middle of the Page for Easier Pen-Handling In one embodiment, the automatic document layout may take into account which objects are likely to be placed in the middle of a page. In such a case, a determination is made as to which objects are likely to be placed in the middle of the page. Then a partial order is computed such that the X-cut location is in a certain range. Rules on the interpretation of logical labels (e.g., title on top, hand written field (not signature) in the middle of page) are used if the resulting partial ordering does not interfere with any other ordering rule. The seed layout describing the arrangement may include information on what regions of the page are desired regions for a subset of specified objects, such as form objects to be filled out by hand with a pen.

In another embodiment, a system may be used to learn good handwritten field positions from analysis of filled-in handwritten fields.

In one embodiment, positioning of to-be-filled-in-by-handwriting image object is user-dependent, e.g., more to the left for right-handed people, more to the right for left-handed people.

In FIGS. 14-16, the "instructions" field are at the top of the document and "history" objects are in reading order according to the seed layout. The reading order in which "history" objects are first and "form" objects are later has a small weight in the cost function. There is a larger weight penalty in the cost function if the "form" object is in the bottom 20% of the document. FIG. 14 shows a result with no "history" objects. FIG. 15 shows a result where both the "history-before-form" in reading order and the "form-not-at-the-bottom" goals are satisfied. FIG. 16 shows only the "form-not-at-bottom" goal being satisfied. All of the results in FIG. 14-16 are generated by using the optimization procedure on a single cost function.

Constraints on Scaling of Objects

A box may have different scaling attributes depending on the content of the box. For example, consider a particular text box. Scaling of ±5% might be allowed for this box, while maintaining the initial aspect ratio ($a_{i0}=w_{i0}/h_{i0}$) of the box (since reflow of text within the box is not considered herein). For a particular image, more scaling can be allowed without strictly maintaining the aspect ratio. In one embodiment, to implement this, every box has the following attributes:

lower limit and upper limit of the width scale (ws) factor, $wsl_i$ and $wsu_i$ respectively, lower limit and upper limit of the height scale factor, $hsl_i$ and $hsu_i$ respectively, lower limit and upper limit of the aspect ratio scale factor, $asl_i$ and $asu_i$ respectively.

The default value of all the attributes is 1.

Figures 17A, 17B:
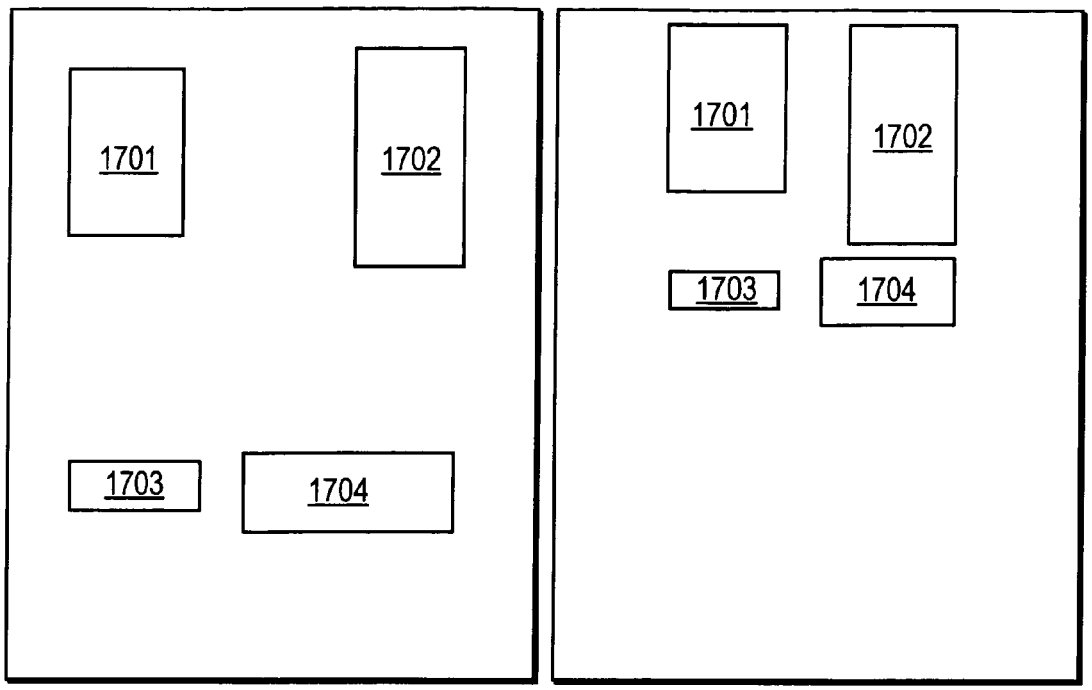
FIGS. 17A and 17B illustrate an example of a layout representation taken into account scaling constraints.

Scaling generates the following constraints for each box i.

$$w_{i0}wsl_i \leq w_{i0} \leq w_{i0}wsu_i$$

$$h_{i0}hsl_i \leq h_i \leq h_{i0}hsu_i$$

$$h_{i0}a_{i0} asl_i \leq w_i \leq h_{i0}a_{i0} asu_i, \quad (8)$$

where the variables are $w_i$, $h_i$. Cost on scaling can be added to the problem formulation, for example, $$\beta \frac{|w_i - w_{i0}|}{w_{i0}}, \quad (9)$$

where β is the relative weight of this cost. In one embodiment, β is 1. An example of a layout representation taken into account scaling constraints is shown in FIGS. 8A and 17B. Referring to FIGS. 17A and 17B, layout representation (17A) computed from the initial placement (17B) including a minimal scaling attribute for object 1704 into the constraints and alignment and white-space cost into the objective function. More specifically, FIG. 17A includes objects 1701-1704 that have an initial placement. In the layout representation in FIG. 17B, objects 1701 ad 1702 remain the same size as in their initial placement but are positioned closer to each other and their tops edges are aligned. Also in FIG. 17B, both objects 1703 and 1704 have been scaled (reduced) and positioned closer to objects 1701 and 1702.

Dependency of Constraints and Costs on Object Content

In the following, various methods are described of how object content can influence constraints and costs of the optimization problem.

Object-Dependent Selection of Scaling, Change of Aspect Ratio, and Cropping Constraints Object content can be included into the constraints for scaling, change of aspect ratio, and cropping. Depending on the object type, a subset of those constraints may be chosen to be included into the formulation of a specific layout problem. The following examples demonstrate this concept.

With respect to barcodes, cropping should not be allowed. For horizontal barcodes scaling in vertical dimension may be allowed.

With respect to logos, scaling could be allowed. Distortions through change of aspect ratio or cropping may not be allowed.

With respect to pictures that are abstract, textures, patterns, backgrounds, landscapes without subjects that a human would recognize as having specific aspect ratios, all operations could be allowed.

With respect to pictures of people, animals and other subjects that a human would recognize as having specific aspect ratios and as complete objects, scaling without changing the aspect ratio could be allowed. Any change of aspect ratio is not allowed.

With respect to text boxes, scaling could be allowed. Distortions though change of aspect ratio or cropping may not be allowed (reflow is not considered).

Dependency of Object-Separating White Space on Object Content

Object content that may influence the object-separating white space is font information (e.g., size, type, style, capitalization); pattern info (e.g., text, image, graphics, table); and color.

Assume that a minimal distance $D_{min}$ is required between boxes in order to assure visible separation. That means $x_j - x_i - w_i \geq D_{min}$ if there is a directed edge from vertex i to j in the horizontal graph. The following generalization for including object content into the minimal distance is proposed:

$$D_{min} = D_{min}(C(\Omega), C(O_i), C(O_j))$$

where $\Omega = \{O_i\}$ is the document object collection and C(O) the content properties of object O.

Font Size

An example for C(O) is the font size of $O_j$. Then $D_{min}$ can be defined as $$D_{min} = (C(\Omega), C(O_i), C(O_j))$$
$$= \varepsilon \cdot \lfloor \max_i (C(O_i)) - \min_i (C(O_j)) - |C(O_i) - C(O_j)| \rfloor + \delta$$

where δ>0. In one embodiment, δ equals ten and ε equals three. In one embodiment, font size is measured in points.

Pattern Distance Measure

Assume that C(O) contains information about the pattern structure of O. Pattern structure could be text vs. graphics vs. images vs. tables, or statistical measures such as characteristics of the intensity distribution of the object intensity. Those characteristics could be given by moments of the probability distribution. Other pattern characteristics that may be used include density of text (bold face vs. plain). This representation of a pattern structure can be stored in a feature vector. Distances between feature vectors can be included into the minimal distance constraint in the following way.

In general, given a feature vector f for an object O and a distance measure d for feature vectors (see e.g., Duda, R., Hart, P., Stork, D., "Pattern Classification," John Wiley & Sons, Inc., New York, 2001), the generalized minimal distance $D_{min}$ $(C(\Omega), C(O_i), C(O_j))$ can be expressed as $$D_{min} = (C(\Omega), C(O_i), C(O_j)) \quad (10)$$
$$= \varepsilon \cdot [\max_{i,j} d(f(O_i)), f(O_j)) - d(f(O_i), f(O_j))]$$

In one embodiment, ε equals 3.

The font size measure from above can be included in this generalized distance measure.

Color Distance Measure

Color differences between objects can be included into the distance measure. Assume that a color difference between two objects is measured by $\Delta(O_i, O_j)$. This metric may be the distance between background or average colors of the objects measured in the CIELAB ΔE metric. The minimal distance between object $O_i$ and $O_j$ should then be inverse proportional to the $\Delta(O_i, O_j)$ distance. That means object with similar colors should be placed with more space than objects with less similar colors. In one embodiment, the following distance measure is used:

$$D_{min} = (C(\Omega), C(O_i), C(O_j)) = \varepsilon \lfloor 1 + 1/\Delta(O_i, O_j) \rfloor. \quad (11)$$

In an alternative embodiment, the perceived contrast of two color patches placed with separating background color for a subset of colors is computed and the contrast values are stored in a lookup table. Given two objects $O_i$ and $O_j$, a minimal distance $D_{min}$ can be chosen by finding the background colors for $O_i$, $O_j$ and the separating background color that provides a necessary contrast value. This necessary contrast value may be determined via user testing.

Applications

The domain of applications for the automated document layout design described herein includes the domain of repurposing of documents. Since the layout is computed from the initial arrangement of objects, the targeted repurposing applications include those where there is no original common layout available. For example, the image objects originate in different documents. Nevertheless, the case where a subset of objects comes from the same documents can also be handled.

In one application, in order to produce a summary sheet, document image object from various document source are arranged on a canvas and need to be laid out such that text is readable and an aesthetic layout is achieved.

Figure 18:
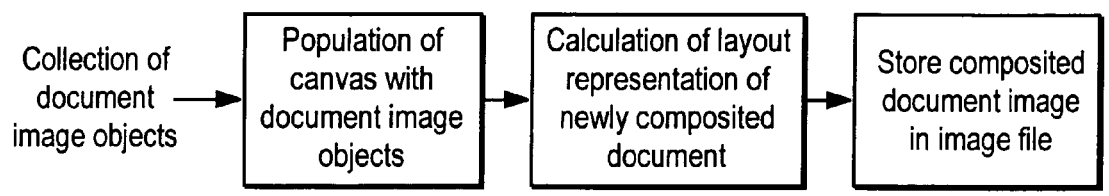
FIG. 18 is a flow diagram of one embodiment of an automatic document layout process.

FIG. 18 is a flow diagram of one embodiment of an automatic document layout process of the present invention. The process is performed by processing logic that may comprise hardware (circuitry, dedicated logic, etc.), software (such as is run on a general purpose computer system or a dedicated machine), or a combination of both. Such processing may be part of a system for automated layout design with each of the processing blocks representing modules or units in the system.

Referring to FIG. 18, the processing begins by populating a canvas with document image objects from a collection of document image objects 1810 (processing block 1801). Populating the canvas can be performed by a user placing boxes on the canvas approximate locations. Populating the canvas can be performed by an automated method that extends layout information from a document. Next, processing logic calculates a layout representation of the newly composited document (processing block 1802) and then stores the composited document image in an object-based image file format (processing block 1803).

This technique is also applicable to the area one-to-one marketing and variable data printing.

In another application, various outputs of a common input are created dependent on specific instruction, e.g. authorization constraints. As a result, objects are removed from the page. The layout of the remaining objects may need to be adjusted.

An Example of a Computer System

Figure 19:
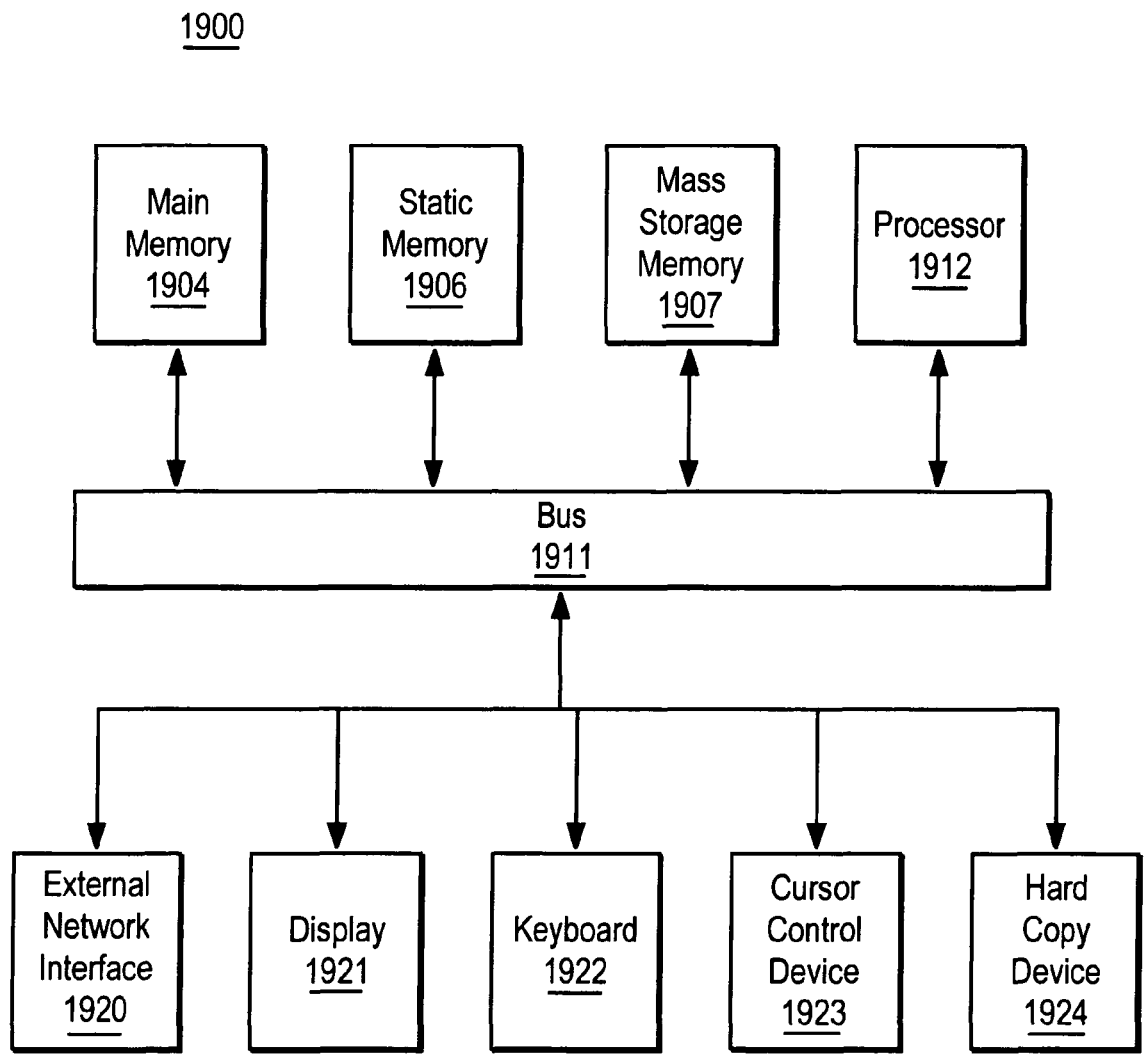
FIG. 19 is a block diagram of an exemplary computer system.

FIG. 19 is a block diagram of an exemplary computer system that may perform one or more of the operations described herein. Referring to FIG. 19, computer system 900 may comprise an exemplary client or server computer system. Computer system 1900 comprises a communication mechanism or bus 1911 for communicating information, and a processor 1912 coupled with bus 1911 for processing information. Processor 1912 includes a microprocessor, but is not limited to a microprocessor, such as, for example, Pentium™, PowerPC™, etc.

System 1900 further comprises a random access memory (RAM), or other dynamic storage device 1904 (referred to as main memory) coupled to bus 1911 for storing information and instructions to be executed by processor 1912. Main memory 1904 also may be used for storing temporary variables or other intermediate information during execution of instructions by processor 1912.

Computer system 1900 also comprises a read only memory (ROM) and/or other static storage device 1906 coupled to bus 1911 for storing static information and instructions for processor 1912, and a data storage device 1907, such as a magnetic disk or optical disk and its corresponding disk drive. Data storage device 1907 is coupled to bus 1911 for storing information and instructions.

Computer system 1900 may further be coupled to a display device 1921, such as a cathode ray tube (CRT) or liquid crystal display (LCD), coupled to bus 1911 for displaying information to a computer user. An alphanumeric input device 1922, including alphanumeric and other keys, may also be coupled to bus 1911 for communicating information and command selections to processor 1912. An additional user input device is cursor control 1923, such as a mouse, trackball, trackpad, stylus, or cursor direction keys, coupled to bus 1911 for communicating direction information and command selections to processor 1912, and for controlling cursor movement on display 1921.

Another device that may be coupled to bus 1911 is hard copy device 1924, which may be used for marking information on a medium such as paper, film, or similar types of media. Another device that may be coupled to bus 1911 is a wired/wireless communication capability 1925 to communication to a phone or handheld palm device.

Note that any or all of the components of system 1900 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for automated document layout creation comprising:

receiving a first layout of document image objects;

creating relative positioning constraints from the document image objects based on the first layout of document image objects; and creating, with a processor, a second layout of document image objects subject to the relative positioning constraints corresponding to a non-overlapping placement of the document image objects in the second layout while maintaining a relative positioning of the document image objects from the first layout, at least one of the relative positioning constraints being based on object content in one or more of the document image objects, the relative positioning constraints corresponding to the relative positioning of the document image objects with respect to each other, wherein creating the second layout comprises setting up an optimization framework that formulates design of the second layout as a convex optimization problem and uses a convex optimization algorithm to seek a solution to at least one cost function, wherein the optimization framework includes one or more constraints and one or more costs, and wherein at least one of the constraints is dependent upon placement positions of document image objects in the first layout and attributes derived from the individual document image objects, and further wherein creating the relative positioning constraints comprises creating a structure to capture logical positioning of groups of objects that imposes a hierarchy of ordering on the document image objects.

2. The method defined in claim 1 wherein creating a second layout is performed using a convex optimization algorithm to seek a solution to at least one cost function.

3. The method defined in claim 1 wherein creating the relative positioning constraints is from relative positioning graphs developed from logical document analysis results.

4. The method defined in claim 1 wherein the relative positioning constraints restrict location of an object based on a purpose associated with the object.

5. The method defined in claim 1 wherein the relative positioning constraints are represented by graph models.

6. The method defined in claim 1 wherein the relative positioning constraints include user and application input.

7. The method defined in claim 1 further comprising adapting constraints based on object content in one or more document image objects.

8. The method defined in claim 1 further comprising deriving constraints from the content of the document image objects and meta data results of logical layout analysis.

9. The method defined in claim 1 further comprising defining a cost function that includes costs for aesthetic measures.

10. The method defined in claim 1 further comprising determining a set of one or more document objects for scaling and determining one or more scaling parameters.

11. The method defined in claim 10 wherein determining the set of one or more document objects for scaling is based on presence or absence of one or more of text, font size of text, results of image content analysis.

12. The method defined in claim 1 wherein the second layout includes a non-overlapping placement of the document image objects while maintaining relative positioning of the document image objects with respect to aesthetic layout criterion.

13. The method defined in claim 1 wherein the optimization framework includes one or more constraints and one or more costs that are dependent on object content and are based on aesthetic measures.

14. The method defined in claim 1 wherein the optimization framework uses geometric aesthetic layout measures.

15. A non-transitory computer readable medium having instructions stored thereon which, when executed by a system, cause the system to perform a method for automated document layout creation comprising:
   receiving a first layout of document image objects;
   creating relative positioning constraints from the document image objects based on the first layout of document image objects; and
   creating a second layout of document image objects subject to the relative positioning constraints corresponding to a non-overlapping placement of the document image objects in the second layout while maintaining a relative positioning of the document image objects from the first layout, at least one of the relative positioning constraints being based on object content in one or more of the document image objects the relative positioning constraints corresponding to the relative positioning of the document image objects with respect to each other, wherein creating the second layout comprises setting up an optimization framework that formulates design of the second layout as a convex optimization problem, wherein the optimization framework includes one or more constraints and one or more costs, and wherein at least one of the constraints is dependent upon placement positions of document image objects in the first layout and attributes derived from the individual document image objects,
   and further wherein creating the relative positioning constraints comprises creating a structure to capture logical positioning of groups of objects that imposes a hierarchy of ordering on the document image objects.

16. An apparatus for automated document layout creation comprising:
   a memory; and
   a processor coupled with the memory to:
      receive a first layout of document image objects,
      create relative positioning constraints from the document image objects based on the first layout of document image objects, and
      create a second layout of document image objects subject to the relative positioning constraints corresponding to a non-overlapping placement of the document image objects in the second layout while maintaining a relative positioning of the document image objects from the first layout, at least one of the relative positioning constraints being based on object content in one or more of the document image objects, the relative positioning constraints corresponding to the relative positioning of the document image objects with respect to each other, wherein creating the second layout comprises the processor to set up an optimization framework that formulates design of the second layout as a convex optimization problem, wherein the optimization framework includes one or more constraints and one or more costs, and wherein at least one of the constraints is dependent upon placement positions of document image objects in the first layout and attributes derived from the individual document image objects,
      and further wherein creating the relative positioning constraints comprises creating a structure to capture logical positioning of groups of objects that imposes a hierarchy of ordering on the document image objects.

* * * * *